United States Patent Office 3,793,345
Patented Feb. 19, 1974

3,793,345
5,11-DIHYDRODIBENZ[b,e][1,4]OXAZEPINE-5-ALKYLAMIDOXIMES
Harry Louis Yale, New Brunswick, and Ramesh B. Petigara, Somerset, N.J., assignors to E. R. Squibb & Sons, Inc., Princeton, N.J.
No Drawing. Filed Aug. 2, 1972, Ser. No. 277,430
Int. Cl. C07d 9/00
U.S. Cl. 260—333               5 Claims

ABSTRACT OF THE DISCLOSURE 5,11-dihydrodibenz[b,e][1,4]oxazepine and 5,11-dihydrodibenzo[b,e][1,4]thiazepine - 5 - alkylamidoximes and their methods of preparation are disclosed. In addition, pharmaceutical compositions containing said compounds and methods for using said compositions as central nervous system stimulates and muscle relaxants are reported.

---

Numerous central nervous system stimulants are presently being dispensed with a certain degree of success; however, safer more effective compounds are constantly being sought after.

This invention relates to compounds of the formula:

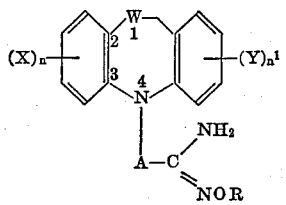

wherein X and Y are hydrogen, halogen, (such as chlorine, bromine, fluorine, etc.), trifluoromethyl, aryl, substituted aryl, lower alkyl, lower alkoxy, di-lower alkylaminosulfonyl, carboxy, aryl-lower alkylmercapto and lower alkylmercapto with the proviso that when X is a group other than hydrogen, Y is hydrogen and when Y is a group other than hydrogen, X is hydrogen except that X and Y may both be chlorine simultaneously; $n$ and $n^1$ are 1 or 2; W is oxygen or sulfur and R is hydrogen, lower alkyl, aryl-lower alkyl and substituted aryl-lower alkyl, and A is a hydrocarbon of up to fifteen carbon atoms having eight carbon atoms that form a straight chain between the nitrogen and the amidoxime group, with the proviso that in counting the carbon atoms of said eight carbon atom straight chain, one may in a structure of type III utilize a side of a carbocylic ring [—CH—(CH$_2$)$_{n6}$—CH— or —CH—(CH$_2$)$_{n7}$—CH—] and said hydrocarbon fragment of fifteen carbon atoms possesses 0, 1, or 2 double or triple bonds, and pharmaceutically acceptable salts thereof. However, the preferred hydrocarbon grouping represented by A should have a total of eight carbon atoms and the straight chain fragment should comprise up to four carbon atoms.

More specifically this invention relates to compounds of the formulae:

(I)
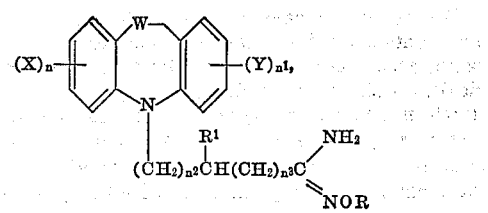

(II)
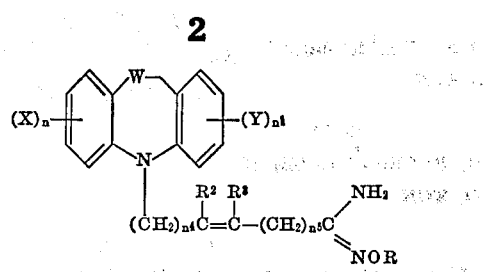

(III)
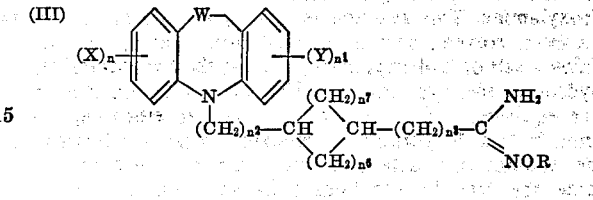

wherein W, X, Y, R, $n$ and $n^1$ are as previously described; $R^1$, $R^2$ and $R^3$ are hydrogen, lower alkyl, lower alkenyl and cycloalkyl; $n^2$ and $n^3$ are 0, 1 or 2; $n^4$ and $n^5$ are 1 to 2; $n^6$ and $n^7$ are 0, 1, 2, 3, 4 with the proviso that $n^6$ and $n^7$ cannot both be zero,, and the total of $n^6+n^7$ be greater than 2 and pharmaceutically acceptable salts thereof which exhibit central nervous system stimulant and striated muscle relaxant properties.

In addition, this invention relates to methods for preparing said compound compositions containing said compound compositions containing said compounds and methods for using said compositions to induce central nervous system stimulation or striated muscle relaxation.

The compounds of this invention may be prepared from nitriles of the formulae:

(IV)
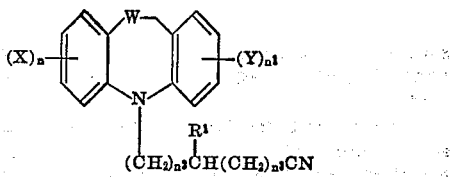

(V)
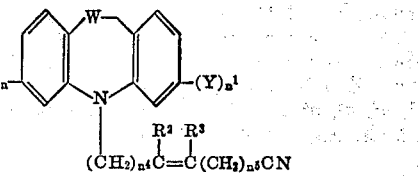

and (VI)
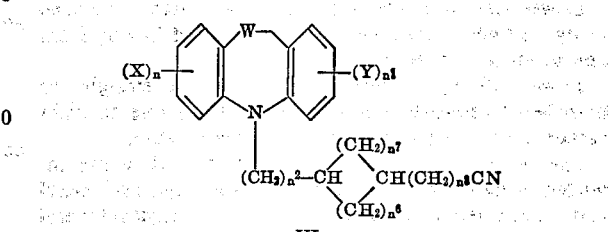

The nitriles of Formulae IV, V and VI may be prepared by the general procedure described in the Journal of Medicinal Chemistry 13, (1970) 713. In addition to that procedure, standard nucleophilic displacement reactions may be employed to prepare the necessary starting materials. Examples of these displacement reactions are shown below.

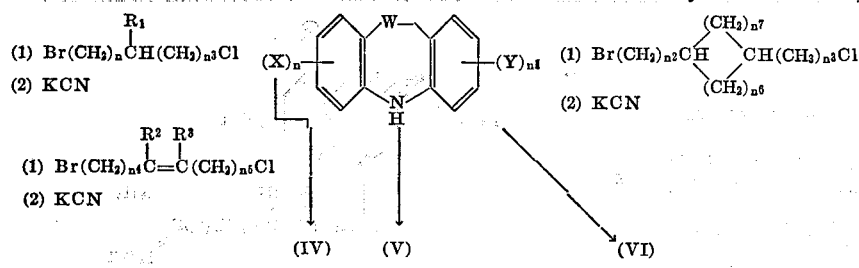

Compounds of the types IV, V and VI are converted to their corresponding amidoximes by reaction with hydroxylamine. This reaction is usually carried out in an alcoholic solvent, such as ethanol, isopropanol, etc. utilizing a salt of hydroxylamine, such as the hydrochloride, hydrobromide, hydroiodide, sulfate or acetate and at least one equivalent of a base such as sodium ethoxide, sodium hydroxide, potassium-t-butoxide, potassium hydroxide, sodium carbonate, potassium carbonate, etc. to liberate the free hydroxylamine in situ. An alternative method for preparing the amidoximes is utilizing a pyridine type compound as the base and solvent and a salt of hydroxylamine.

The above reactions are generally carried out at a temperature range of from about 45° C. to 80° C. depending upon the solvent being used. The time required is generally from about 12 to about 72 hours and is not critical since it may be greatly varied depending upon the temperature being employed.

The amidoximes are converted into the O-substituted amidoximes by reaction which compounds of the following formula:

$$R^4Z$$

wherein $R^4$ is lower alkyl, aryl-lower alkyl or substituted aryl-lower alkyl and Z is a leaving group, such as bromide, chloride, iodide, tosylate, quaternary amine, etc., preferably bromide.

This reaction is carried out in the presence of a base such as sodium methoxide, potassium carbonate, sodium hydroxide, etc. in an aqueous or aqueous-alcoholic solvent.

The preferred structures are those wherein X is hydrogen, trifluoromethyl and chlorine; Y is hydrogen, trifluoromethyl, chlorine, methoxy, dimethylaminosulfonyl, methylmercapto; R, $R^2$ and $R^3$ are hydrogen, methyl or benzyl; $R^1$ is hydrogen, methyl, cyclopropyl or benzyl.

The most preferred being wherein W is oxygen and when Y is hydrogen, X is trifluoromethyl or chloro and when X is hydrogen, Y is trifluoromethyl or chloro; $n$, $n^1$, $n^2$, $n^3$, $n^4$ and $n^5$ are 1; R is hydrogen or methyl, $R^1$ is hydrogen, and when $n^6$ is 0, $n^7$ is 3 or when $n^6$ is 2, $n^7$ is 2.

In the present invention the term lower alkyl is intended to mean a straight or branched hydrocarbon group having from one to eight carbon atoms.

Lower alkenyl is intended to mean a straight, branched or cyclic hydrocarbon which is unsaturated having from one to eight carbon atoms.

Lower alkoxy is intended to mean a straight or branched hydrocarbon group having from one to eight carbon atoms and is linked to an oxygen atom.

The terms cycloalkyl and cyclic hydrocarbon are intended to mean grouping such as cyclopropyl, cyclohexyl and substituted ring systems such as methylcyclobutyl and diethylcyclopropyl, wherein the total number of carbon atoms is not over eight.

The term aryl is intended to mean phenyl, naphthyl, etc. and substituted aryl to mean an aryl group substituted with a lower alkyl, lower alkoxy, halogen, trifluoromethyl, etc.

The term pharmaceutically acceptable salt is intended to encompass the acid addition salts utilizing acids such as hydrochloric acid, hydrobromic acid, sulfuric acid, phosphoric acid, maleic acid, fumaric acid, acetic acid, citric acid, tartaric acid, pamoic acid, etc.

The amidoximes of this invention and their non-toxic pharmaceutically acceptable acid addition salts have thus been found to be highly useful as central nervous system stimulants in mammals such as dogs, cattle, sheep, etc., when administered in amounts ranging from about 6.25 mg. to about 100 mg. per kg. of body weight per day. A preferred dosage regimen for optimum results would be from about 12.5 mg. to about 50 mg. per kg. of body weight per day, and such dosage units are employed that a total of from about 440 mg. to about 1500 mg. of active ingredient for a subject of about 70 kg. body weight are administered in a 24 hour period. More specifically, a daily dose of about 0.20 g. to about 1.0 g. of active ingredient for an average sized mammal.

In addition, the above compounds have also been found to be highly useful as striated muscle relaxants in mammals such as dogs and cats when administered in amounts ranging from about 12.5 mg. to about 200 mg. per kg. of body weight per day. A preferred dosage regimen for optimum results would be from about 25 mg. to about 125 mg. per kg. of body weight per day, and such dosage units are employed that a total of from about 600 mg. to about 2100 mg. of active ingredient for a subject of about 70 kg. body weight are administered in a 24 hour period. More specifically, a daily dose of about 0.30 g. to about 1.5 g. of active ingredient for an average sized mammal.

The compounds of the present invention in the described dosages are intended to be administered orally; however, other routes such as rectally, intraperitoneally, subcutaneously, intramuscularly or intravenously may be employed.

The active compounds of the present invention are orally administered, for example, with an inert diluent or with an assimilable edible carrier, or they may be enclosed in hard or soft gelatin capsules, or they may be compressed into tablets, or they may be incorporated directly with the food of the diet. For oral therapeutic administration, the active compounds of this invention may be incorporated with excipients and used in the form of tablets, troches, capsules, elixirs, suspensions, syrups, wafers, chewing gum, and the like. Such compositions and preparations should contain at least 0.1% of active compound. The percentage in the compositions and preparations may, of course, be varied and may conveniently be between about 5% to about 75% or more of the weight of the unit. The amount of active compound in such therapeutically useful compositions or preparations is such that a suitable dosage will be obtained. Preferred compositions or preparations according to the present invention are prepared so that an oral dosage unit form contains between about 100 and 1000 milligrams of active compounds.

The tablets, troches, pills, capsules and the like may also contain the following: a binder such as gum tragacanth, acacia, corn starch or gelatin; an excipient such as dicalcium phosphate; a disintegrating agent such as corn starch, potato starch, alginic acid and the like; a lubricant such as magnesium stearate; and a sweetening agent such as sucrose, lactose or saccharin may be added or a flavoring agent such as peppermint, oil of wintergreen, or cherry flavoring. When the dosage unit form is a capsule, it may contain in addition to materials of the above type a liquid carrier such as a fatty oil. Various other materials may be present as coatings or to otherwise modify the physical form of the dosage unit, for instance, tablets, pills or capsules may be coated with shellac, sugar, or both. A syrup or elixir may contain the active compounds, sucrose as a sweetening agent, methyl and propyl parabens as preservatives, a dye and a flavoring such as cherry or orange flavor. Of course, any material used in preparing any dosage unit form should be pharmaceutically pure and substantially non-toxic in the amounts employed.

The invention will be described in greater detail in conjunction with the following specific examples.

EXAMPLE 1

5-(3-chloropropyl)-5,11-dihydro-7-(trifluoromethyl) dibenz[b,e][1,4]oxazepine

A suspension of 62.5 g. of 5,11-dihydro-7-(trifluoromethyl)dibenz[b,e][1,4]oxazepine, 625 ml. of methyl ethyl ketone, 150.0 g. of trimethylene chlorobromide, and 76.5 g. of granular sodium hydroxide was heated under reflux for 8.5 hours, an additional 76.5 g. of granular sodium hydroxide was added and the whole was stirred and heated under reflux for an additional 14 hours. During the heating the color of the reaction mixture changed from deep purple to light yellow. The cooled reaction mixture was diluted with 450 ml. of ice water and stirred in the cold until no more solid remained, the methyl ethyl ketone layer separated, the aqueous phase extracted with 100 ml. of methyl ethyl ketone, and the combined organic phases were washed, dried, and concentrated to give the name compound M.P. about 73–76°.

EXAMPLES 2–7

By substituting in Example 1 for the trimethylene chlorobromide, the following dihalides, and for the 5,11-dihydro-7 - (trifluoromethyl)dibenz[b,e][1,4]oxazepine, the appropriate oxazepine or thiazepine:

1-bromo-3-chlorobutane,
1-bromomethyl-2-(chloromethyl)cyclopentane,
1-bromo-4-chloro-2-butene,
1-bromo-4-chloro-2-(cyclopropyl)butane,
1-bromomethyl-4-(chloromethyl)cyclohexane, and
1-bromo-2-chloroethane, there are obtained:

5-(3-chlorobutyl)-5,11-dihydro-7-methyldibenzo[b,e][1,4]thiazepine,
5-(2-chloromethyl-1-cyclopentylmethyl)-5,11-dihydro-8-(trifluoromethyl)dibenz[b,e][1,4]oxazepine,
5-(4-chloro-2-butenyl)-5,11-dihydro-6-methyl-7-chlorodibenzo[b,e][1,4]thiazepine,
5-(4-chloro-2-(cyclopropyl)butyl)-5,11-dihydro-3-methoxydibenz[b,e][1,4]oxazepine,
5-[4-(chloromethyl)-1-cyclohexylmethyl]-5,11-dihydro-7-fluoro-3-methylmercaptodibenz[b,e][1,4]oxazepine, and
5-(2-chloroethyl)-3-bromo-5,11-dihydrodibenzo[b,e][1,4]thiazepine, respectively.

EXAMPLE 8

5,11-dihydro-7-(trifluoromethyl)dibenz[b,e][1,4] oxazepine-5-butyronitrile

To a suspension of 2.0 g. of anhydrous sodium cyanide in 10 ml. of dimethyl sulfoxide (DMSO) is added dropwise at 90° a solution of 10.3 g. of 5-(3-chloropropyl)-5,11-dihydro - 7 - (trifluoromethyl)dibenz[b,e][1,4]oxazepine, in 20 ml. of DMSO. The reaction mixture is slowly heated to 160° and maintained at this temperature for 30 minutes. The mixture is allowed to cool to 50° and is poured into 400 ml. of cold water. The mixture is extracted with 3×250 ml. of ether, after saturating the aqueous layer with solid sodium chloride. The ether extracts are washed, dried, and filtered. The filtrate upon concentration gives 10.3 g. of a solid that is recrystallized from hexane to give about 8.3 g. of the name compound, M.P. about 68–70°.

EXAMPLES 9–14

According to the method of Example 8, upon substituting in place of 5-(3-chloropropyl)-5,11-dihydro-7-(trifluoromethyl)dibenz[b,e][1,4]oxazepine, the following compounds:

5-(3-chlorobutyl)-5,11-dihydro-7-methyldibenzo[b,e][1,4]thiazepine,
5-(2-chloromethyl-1-cyclopentylmethyl)-5,11-dihydro-8-(trifluoromethyl)debenz[b,e][1,4]oxazepine,
5-(4-chloro-2-butenyl)-5,11-dihydro-6-methyl-7-chlorodibenzo[b,e][1,4]thiazepine,
5-(4-chloro-2-cyclopropylbutyl)-5,11-dihydro-3-methoxydibenz[b,e][1,4]oxazepine,
5-[4-(chloromethyl)-1-cyclohexylmethyl]-5,11-dihydro-7-fluoro-3-methylmercaptodibenz[b,e][1.4]oxazepine, and
5-(2-chloroethyl)-3-bromo-5,11-dihydrodibenzo[b,e][1,4]thiazepine, one obtains:

5-(3-cyanobutyl)-5,11-dihydro-7-methyldibenzo[b,e][1,4]thiazepine,
5-(2-cyanomethyl-1-cyclopentylmethyl)-5,11-dihydro-8-(trifluoromethyl)dibenz[b,e][1,4]oxazepine,
5-(4-cyano-2-butenyl)-5,11-dihydro-6-methyl-7-chlorodibenzo[b,e][1,4]thiazepine,
5-(4-cyano-2-cyclopropylbutyl)-5,11-dihydro-3-methoxydibenz[b,e][1,4]oxazepine,
5-[(4-cyanomethyl)-1-cyclohexylmethyl]-5,11-dihydro-7 fluoro-3-methylmercaptodibenz[b,e][1,4]oxazepine, and
5-(2-cyanoethyl)-3-bromo-5,11-dihydrodibenzo-[b,e][1,4]thiazepine, respectively.

EXAMPLE 15

5,11-dihydro-7-(trifluoromethyl)dibenz[b,e][1,4] oxazepine-5-propionamidoxime, hydrochloride A solution of 5.4 g. of sodium methoxide in 30 ml. of absolute ethanol is added dropwise to a solution of 6.9 g. of hydroxylamine hydrochloride in 110 ml. of absolute ethanol, the sodium chloride is filtered, and the filtrate is added dropwise to a stirred suspension of 10.1 g. of 5,11-dihydro-7-(trifluoromethyl)dibenz[b,e][1,4]oxazepine-5-propionitrile in 100 ml. of absolute ethanol. The reaction mixture is heated to 55° when a clear solution results, is stirred at 55° for 70 hours, and finally heated under reflux for 30 minutes. The reaction mixture is concentrated in vacuo to give 11.1 g. of a semisolid residue; this is dissolved in 350 ml. of ether and the solution is extracted with three 50 ml. portions of 2% aqueous hydrochloric acid. The combined acid extracts are cooled and made alkaline with 50% aqueous sodium hydroxide. The base is extracted with ether, the extracts are washed, dried, treated with Darco and concentrated to give 8.9 of the crude amidoxime. This is dissolved in 70 ml. of isopropanol, and the solution is treated with a solution of 3.0 g. of oxalic acid in 30 ml. of isopropanol, to give 7.6 g. of the oxalate salt, M.P. 180–184°. This is recrystallized from 230 ml. of isopropanol to give about 7.0 g. of the oxalate salt, M.P. about 182–183° (dec.).

The above oxalate salt is dissolved in 30 ml. of water, the solution is cooled and made alkaline with 50% aqueous sodium hydroxide. The base is extracted into ether, the extracts are washed, dried and treated with 15 ml. of 3.24 N ethereal hydrogen chloride. The solid is filtered, washed with anhydrous ether and recrystallized from isopropanol to give the name compound.

EXAMPLE 16

7-chloro-5,11-dihydrodibenz[b,e][1,4]oxazepine-5-propionamidoxime, maleate salt (1:1)

A mixture of 8.6 g. of sodium carbonate, 3.5 g. of hydroxylamine hydrochloride and 4.5 g. of 7-chloro-5,11-dihydrodibenz[b,e][1,4]oxazepine-5-propionitrile in 100 ml. of n-butanol is heated at 80° for 12 hours. The reaction mixture is cooled, filtered and concentrated to dryness to give 5.1 g. of a solid. This is dissolved in 30 ml. of isopropanol and the solution is treated with a solution of 1.8 g. of oxalic acid in 10 ml. of isopropanol to give 3.1 g. of the oxalate salt. This is recrystallized from isopropanol to give about 2.2 g. of the oxalate, M.P. about 173–175° (dec.).

The oxalate salt is dissolved in 15 ml. of water, the solution is cooled and made alkaline with 50% aqueous sodium hydroxide. The base is extracted with 3–100 ml. of ether, the extracts are washed, dried and treated with a solution of 1.8 g. of maleic acid in 40 ml. of ether. The solid is filtered and recrystallized from isopropanol to give the name compound.

EXAMPLE 17

5,11-dihydro-(7-trifluoromethyl)dibenz[b,e][1,4]oxazepine-5-butyroamidoxime, hydrochloride A mixture of 10.3 g. of 5,11-dihydro(7-trifluoromethyl)dibenz[b,e][1,4]oxazepine-5-butyronitrile, 7.9 g. of hydroxylamine sulfate in 100 ml. of pyridine is heated at 70° for 48 hours. The mixture is then concentrated to dryness and the residue is dissolved in 400 ml. of ether. The solution is washed, extracted with 3–100 ml. of 5% aqueous hydrochloric acid, the acid extracts are cooled, and made alkaline with 50% aqueous sodium hydroxide. The base is extracted with 3–100 ml. of ether. The ether solution is washed, dried and treated with 3.24 N ethereal hydrogen chloride to give the name compound.

EXAMPLES 18–23

According to the method of Example 17, upon substituting in place of 5,11-dihydro-(7-trifluoromethyl)-dibenz[b,e][1,4]oxazepine-5-butyronitrile, the following compounds:

5-(3-cyanobutyl)-5,11-dihydro-7-methyldibenzo[b,e][1,4]thiazepine, 5-(2-cyanomethyl-1-cyclopentylmethyl)-5,11-dihydro-8-(trifluoromethyl)dibenz[b,e][1,4]oxazepine, 5-(4-cyano-2-butenyl)-5,11-dihydro-6-methyl-6-methyl-7-chlorodibenzo[b,e][1,4]thiazepine, 5-(4-cyano-2-cyclopropylbutyl)-5,11-dihydro-3-methoxydibenz[b,e][1,4]oxazepine, 5-[4-(cyanomethyl)-1-cyclohexylmethyl]5,11-dihydro-7-fluoro-3-methylmercaptodibenz[b,e][1,4]oxazepine, and 5-(2-cyanoethyl)-3-bromo-5,11-dihydrodibenzo[b,e][1,4]thiazepine.

one obtains the hydrochlorides of:

5-[3-(hydroxyamidino)butyl]-5,11-dihydro-7-methyldibenzo[b,e][1,4]thiazepine,

5-[2-(hydroxyamidino)methyl-1-cyclopentylmethyl]-5,11-dihydro-8-(trifluoromethyl)dibenz[b,e][1,4]oxazepine, 5-[4-(hydroxyamidino)-2-butenyl]-5,11-dihydro-6-methyl-7-chlorodibenzo[b,e][1,4]thiazepine, 5-[4-(hydroxyamidino)-2-cyclopropylbutyl]-5,11-dihydro-3-methoxydibenz[b,e][1,4]oxazepine, 5-[4-(hydroxyamidino)methyl-1-cyclohexylmethyl] 5,11-dihydro-7-fluoro-3-methylmercaptodibenzo[b,e][1,4]oxazepine, and 5-[2-(hydroxyamidino)ethyl]-3-bromo-5,11-dihydrodibenzo[b,e][1,4]thiazepine, respectively.

EXAMPLE 24

O-benzyl-7-chloro-5,11-dihydrodibenz[b,c][1,4]oxazepine-5-propionamidoxime

To a solution of 11.0 g. of 7-chloro-5,11-dihydrodibenz[b,e][1,4]oxazepine-5-propionamidoxime in 160 ml. of absolute ethanol, there is added, in 15 minutes a solution of sodium methoxide in 35 ml. of absolute ethanol. The mixture is stirred at 50° for 2 hours and to this is added 8.6 g. of benzyl bromide. The reaction mixture is stirred at 50° for 12 hours, the solvent is removed, and the residue is treated with 150 ml. of water and extracted with 3–150 ml. of ether. The ether extracts are washed, dried and concentrated to give a solid, which is recrystallized from hexane to give the name compound.

EXAMPLES 25–30

According to the method of Example 24, upon substituting in the place of 7-chloro-5,11-dihydrodibenz[b,e][1,4]oxazepine-5-propionamidoxime, the following compounds:

5-[3-(hydroxyamidino)butyl]-5,11-dihydro-7-methyldibenzo[b,e][1,4]thiazepine,

5-[2-(hydroxyamidino)methyl-1-cyclopentylmethyl]-5,11-dihydro-8-(trifluoromethyl)dibenz[b,e][1,4]oxazepine, 5-[4-(hydroxyamidino)-2-butenyl]-5,11-dihydro-6-methyl-7-chlorodibenzo[b,e][1,4]thiazepine, 5-[-(hydroxyamidino)-2-cyclopropylbutyl]-5,11-dihydro-3-methoxydibenz[b,e][1,4]oxazepine, 5-[4-(hydroxyamidino)methyl-1-cyclohexylmethyl]-5,11-dihydro-7-fluoro-3-methylmercaptodibenz[b,e][1,4]oxazepine, and 5-[2-(hydroxyamidino)ethyl]-3-bromo-5,11-dihydrodibenzo[b,e][1,4]thiazepine, respectively, one obtains:

5-[3-(benzyloxyamidino)butyl]-5,11-dihydro-7-methyldibenzo[b,e][1,4]thiazepine,

5-[2-(benzyloxyamidino)methyl-1-cyclopentylmethyl]-5,11-dihydro-8(trifluoromethyl)dibenz[b,e][1,4]oxazepine, 5-[4-(benzyloxyamidino)-2-butenyl]-5,11-dihydro-6-methyl-7-chlorodibenzo[b,e][1,4]thiazepine, 5-[4-(benzyloxyamidino)-2-cyclopropylbutyl]-5,11-dihydro-3-methoxydibenz[b,e][1,4]oxazepine, 5-[4-(benzyloxyamidino)methyl-1-cyclohexylmethyl]-5,11-dihydro-7-fluoro-3-methylmercaptodibenz[b,e][1,4]oxazepine, and 5-[2-(benzyloxyamidino)ethyl]-3-bromo-5,11-dihydrodibenzo[b,e][1,4]thiazepine, respectively.

EXAMPLE 31

O-methyl-3-chloro-5,11-dihydrodibenzo[b,e][1,4]thiazepine-5-propionamidoxime, hydrochloride To 3-chloro-5,11-dihydrodibenzo[b,e][1,4]thiazepine-5-propionamidoxime, 6.3 g., in a solution of 1.6 g. of sodium hydroxide in 35 ml. of water, is added 2.6 g. of dimethylsulphate and the reaction mixture is stirred 3 hours at room temperature. The mixture is extracted with 3–100 ml. of benzene, the extracts are washed, dried, and concentrated in vacuo. The residue is dissolved in 20 ml. of isopropanol and treated with 8 ml. of 4.8 N isopropanolic hydrogen chloride. The solid is filtered, washed with anhydrous ether and recrystallized from isopropanol to give the name compound.

EXAMPLES 32–37

According to the method of Example 31, upon substituting in the place of 3-chloro-5,11-dihydrodibenzo[b,e][1,4]thiazepine-5-propionamidoxime, the following compounds:

5-[3-(hydroxyamidino)butyl]-5,11-dihydro-7-methyldibenzo[b,e][1,4]thiazepine,

5-[2-(hydroxyamidino)methyl-1-cyclopentylmethyl]-
5,11-dihydro-8-(trifluoromethyl)dibenz[b,e][1,4]
oxazepine,
5-[4-(hydroxyamidino)-2-butenyl]-5,11-dihydro-6-
methyl-7-chlorodibenzo[b,e][1,4]thiazepine,
5-[4-(hydroxyamidino)-2-cyclopropylbutyl]-5,11-
dihydro-3-methoxydibenz[b,e][1,4]oxazepine,
5-[4-(hydroxyamidino)methyl-1-cyclohexymethyl]-5,11-
dihydro-7-fluoro-3-methylmercaptodibenz[b,e][1,4]
oxazepine, and
5-[2-(hydroxyamidino)ethyl]-3-bromo-5,11-
dihydrodibenzo[b,e][1,4]thiazepine, respectively, one obtains:

5-[3-(methoxyamidino)butyl]-5,11-dihydro-7-
methyldibenzo[b,e][1,4]thiazepine,
5-[2-(methoxyamidino)methyl-1-cyclopentylmethyl]-
5,11-dihydro-8-(trifluoromethyl)dibenz[b,e][1,4]
oxazepine,
5-[4-(methoxyamidino)-2-butenyl]-5,11-dihydro-6-
methyl-7-chlorodibenzo[b,e][1,4]thiazepine,
5-[4-(methoxyamidino)-2-cyclopropylbutyl]-5,11-
dihydro-3-methoxydibenz[b,e][1,4]oxazepine,
5-[4-(methoxyamidino)methyl-1-cyclohexylmethyl]-
5,11-dihydro-7-fluoro-3-methylmercaptodibenz[b,e]
[1,4]oxazepine, and
5-[2-(methoxyamidino)ethyl]-3-bromo-5,11-
dihydrodibenzo[b,e][1,4]thiazepine, respectively.

EXAMPLE 38

Preparation of capsule formulation

| Ingredient: | Milligrams per capsule |
| --- | --- |
| 7-chloro-5,11-dihydrodibenz[b,e][1,4]oxazepine-5-propionamidoxime | 400 |
| Starch | 80 |
| Magnesium stearate | 5 |

The active ingredient, starch and magnesium stearate are blended together. The mixture is used to fill hard shell capsules of a suitable size at a fill weight of 485 milligrams per capsule.

EXAMPLE 39

Preparation of tablet formulation

| Ingredient: | Milligrams per tablet |
| --- | --- |
| O-methyl-3-chloro-5,11-dihydrodibenz[b,e][1,4]oxazepine-5-propionamidoxime | 300 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 milliliters of water and heated with stirring to form a paste. This paste is then used to granulate the mixed powders. The wet granules are passed through a No. 8 screen and dried at 120° F. The dry granules are passed through a No. 16 screen. The mixture is lubricated with magnesium stearate and compressed into tablets in a suitable tableting machine. Each tablet contains 300 milligrams of active ingredient.

EXAMPLE 40

Preparation of oral syrup formulation

| Ingredient: | Amount |
| --- | --- |
| 7-(trifluoromethyl) - 5,11 - dihydrodibenz[b,e][1,4]oxazepine-5-propionamidoxime hydrochloride mg | 5000 |
| Sorbitol solution (70% N.F.) ml | 40 |
| Sodium benzoate mg | 150 |
| Sucaryl mg | 90 |
| Saccharin mg | 10 |
| Red Dye (F.D.&C. No. 2) mg | 10 |
| Cherry flavor mg | 50 |
| Distilled water, q.s. to 100 mil. | |

The sorbitol solution is added to 40 milliliters of distilled water and the active ingredient is suspended therein. The sucaryl, saccharin, sodium benzoate, flavor and dye are added and dissolved in the above solution. The volume is adjusted to 100 milliliters with distilled water.

Other ingredients may replace those listed in the above formulation. For example, a suspending agent such as bentonite magma, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

What is claimed is:

1. A compound having the formula

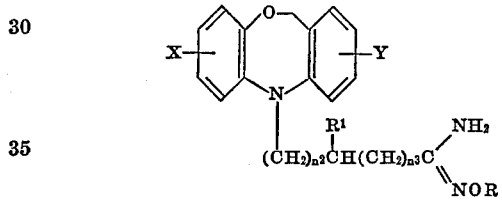

wherein X and Y are selected from the group consisting of hydrogen, chlorine, and trifluoromethyl with the proviso that when X is a group other than hydrogen,, Y is hydrogen, and when Y is a group other than hydrogen, X is hydrogen, except that X and Y may be chlorine simultaneously; R is selected from the group consisting of hydrogen, lower alkyl and benzyl; $R^1$ is selected from the consisting of hydrogen, lower alkyl, and cycloalkyl; $n^2$ is 1 or 2; and $n^3$ is 0, 1, or 2; and a pharmaceutically acceptable acid-addition salt thereof.

2. The compound of claim 1 having the name 7-chloro-5,11-dihydrodibenz[b,e][1,4]oxazepine - 5 - propionamidoxime.

3. The compound of claim 1 having the name, 5,11-dihydro - 7 - (trifluoromethyl)dibenz[b,e][1,4]oxazepine-5-propionamidoxime.

4. The compound of claim 1 having the name, 5,11-dihydro - 7 - (trifluoromethyl)dibenz[b,e][1,4]oxazepine-5-butyroamidoxime.

5. The compound of claim 1 having the name O-methyl-3-chloro - 5,11 - dihydrodibenz[b,e][1,4]oxazepine-5-propionamidoxime.

References Cited

UNITED STATES PATENTS 3,702,852  11/1972  Yale et al. _____ 260—327 B
3,741,983   6/1973  Yale et al. _____ 260—327 B NORMA S. MILESTONE, Primary Examiner U.S. Cl. X.R.

260—240 R, 327 B; 424—275, 278

UNITED STATES PATENT OFFICE
CERTIFICATE OF CORRECTION

Patent No. 3,793,345   Dated February 19, 1974

Inventor(s) Harry Louis Yale and Ramesh B. Petigara

It is certified that error appears in the above-identified patent and that said Letters Patent are hereby corrected as shown below:

Column 1, line 17, "stimulates" should read --stimulants--.

The first structure in column 1 should read as follows:

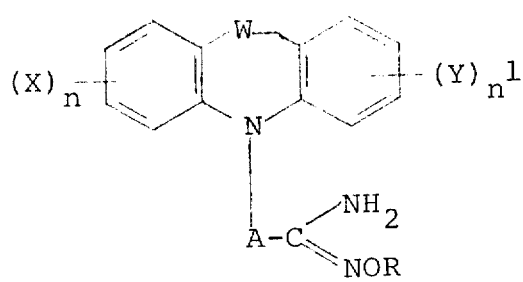

Column 2, lines 22 and 23, "$n^4$ and $n^5$ are 1 to 2;" should read --$n^4$ and $n^5$ are 1 or 2;--.

Column 2, line 24, "zero,," should read --zero,--.

Column 2, line 29, delete "said compound compositions containing".

Column 6, line 15, "debenz" should read --dibenz--.

Column 6, line 21, "[1.4]" should read --[1,4]--.

Column 7, lines 50 and 51, "6-methyl-6-methyl-7-chlordibenzo" should read --6-methyl-7-chlordibenzo--.

Column 8, line 29, "5-[-(hydroxyamidino)" should read --5-[4-(hydroxyamidino)--.

UNITED STATES PATENT OFFICE
CERTIFICATE OF CORRECTION
Page 2

Patent No. 3,793,345  Dated February 19, 1974

Inventor(s) Harry Louis Yale and Ramesh B. Petigara

It is certified that error appears in the above-identified patent and that said Letters Patent are hereby corrected as shown below:

Column 10, line 14, "100 mil." should read --100 ml.--.

Column 10, lines 44 and 45, "from the consisting of" should read --from the group consisting of--.

Signed and sealed this 3rd day of December 1974.

(SEAL)
Attest:

McCOY M. GIBSON JR.
Attesting Officer

C. MARSHALL DANN
Commissioner of Patents